US005689184A

United States Patent [19]
Jeffers et al.

[11] Patent Number: 5,689,184
[45] Date of Patent: Nov. 18, 1997

[54] LARGE SCALE METALLIC OBJECT DETECTOR

[75] Inventors: Frederick John Jeffers, Escondido; Tomasz Marek Jagielinski, Carlsbad, both of Calif.

[73] Assignee: Eastman Kodak Company, Rochester, N.Y.

[21] Appl. No.: 681,002

[22] Filed: Jul. 22, 1996

Related U.S. Application Data

[60] Provisional application No. 60/006,628 Nov. 13, 1995.
[51] Int. Cl.$^6$ .......................... G01N 27/72; G08B 13/24
[52] U.S. Cl. .................. 324/243; 340/551; 340/572; 324/260
[58] Field of Search ........................... 324/243, 241, 324/242, 207.21, 225, 234, 236, 239, 260; 340/551, 572; 338/32 R; 361/180

[56] References Cited

U.S. PATENT DOCUMENTS 4,990,850  2/1991  Votruba .................................. 324/225

*Primary Examiner*—Sandra L. O'Shea
*Assistant Examiner*—Jay M. Patidar
*Attorney, Agent, or Firm*—William F. Noval

[57] ABSTRACT

Apparatus for detecting a magnetizable or conductive object which passes through a magnetic detecting field. The apparatus includes first and second spaced coils for producing a magnetic field between the spaced coils; first and second magnetic field detectors respectively located within the coils with their sensitive axes parallel to the direction of passage of a magnetizable object between the spaced coils and perpendicular to the primary field of the coils; and electrical circuitry coupled to the first and second magnetic field detectors for producing a detection signal in which common mode field noise and thermally induced noise is substantially eliminated.

5 Claims, 3 Drawing Sheets

LARGE SCALE METALLIC OBJECT DETECTOR

CROSS REFERENCE TO RELATED APPLICATION

Reference is made to and priority claimed from U.S. Provisional Application Ser. No. 60/006,628, filed 13 Nov. 1995, entitled LARGE SCALE METALLIC OBJECT DETECTOR.

FIELD OF THE INVENTION

This invention relates in general to the detection of metallic objects which pass through a magnetic detecting field and relates more particularly to the detection of large scale metallic objects by means of a detector assembly in which common mode field noise and thermally generated noise are eliminated.

BACKGROUND OF THE INVENTION

Metal detectors are used to detect metal objects, such as guns, at airports, courts, federal buildings, prisons, and other high security facilities. The metal object is detected when an individual or container (package, suitcase) passes through a portal in which a magnetic detecting field is generated. Typically, the magnetic field is generated on one side of the portal by a magnetic field generating coil(s) and the generated field is sensed on the other side of the portal by a receiving coil. The passage of a metallic object through the magnetic field causes a perturbation in the field received by the receiving coil and a consequent actuation of an alarm. Such detectors are not adequate as anyone can attest to who has been required to remove belt and watch before being allowed to pass through the portal. Receiving coils are prone to noise caused by thermal and other environmental factors.

U.S. Pat. No. 4,990,850, issued Feb. 5, 1991, inventor Votruba, discloses apparatus and methods for monitoring a magnetic field and or detecting ferromagnetic materials. As disclosed, the presence of magnetic objects is detected by the use of a primary field from a large permanent magnet. Detection is effected by two Hall effect sensors equipped with flux concentrators in the form of soft magnetic rods. The Hall detectors are arranged adjacent to one another and positioned so that they detect nearly the same field. His sensors are oriented perpendicular to the primary field. The outputs of the detectors are connected electrically so that their voltage versus field curves have opposite slope when both sensors are exposed to the same signal field. Although signal degradation due to thermal drift is minimized, the Votruba arrangement cannot eliminate common mode field noise.

There is thus a need to provide a large scale metallic detector which is simple in arrangement and cost and which produces an output signal which is immune to common mode field noise and thermally induced noise.

SUMMARY OF THE INVENTION

According to the present invention there is provided a solution to the problems and needs of the prior art.

According to an aspect of the present invention, there is provided apparatus for detecting a magnetizable object comprising: first and second spaced coils for producing a magnetic field between said spaced coils; first and second magnetic field detectors respectively located within said coils with their sensitive axes parallel to the direction of travel of a magnetizable object passing between said spaced coils and perpendicular to the primary field of the coils; and electrical circuitry coupled to said first and second magnetic field detectors for producing a detection signal in which common mode field noise and thermally induced noise is substantially eliminated.

DESCRIPTION OF THE PREFERRED EMBODIMENT(S)

Figure 1:
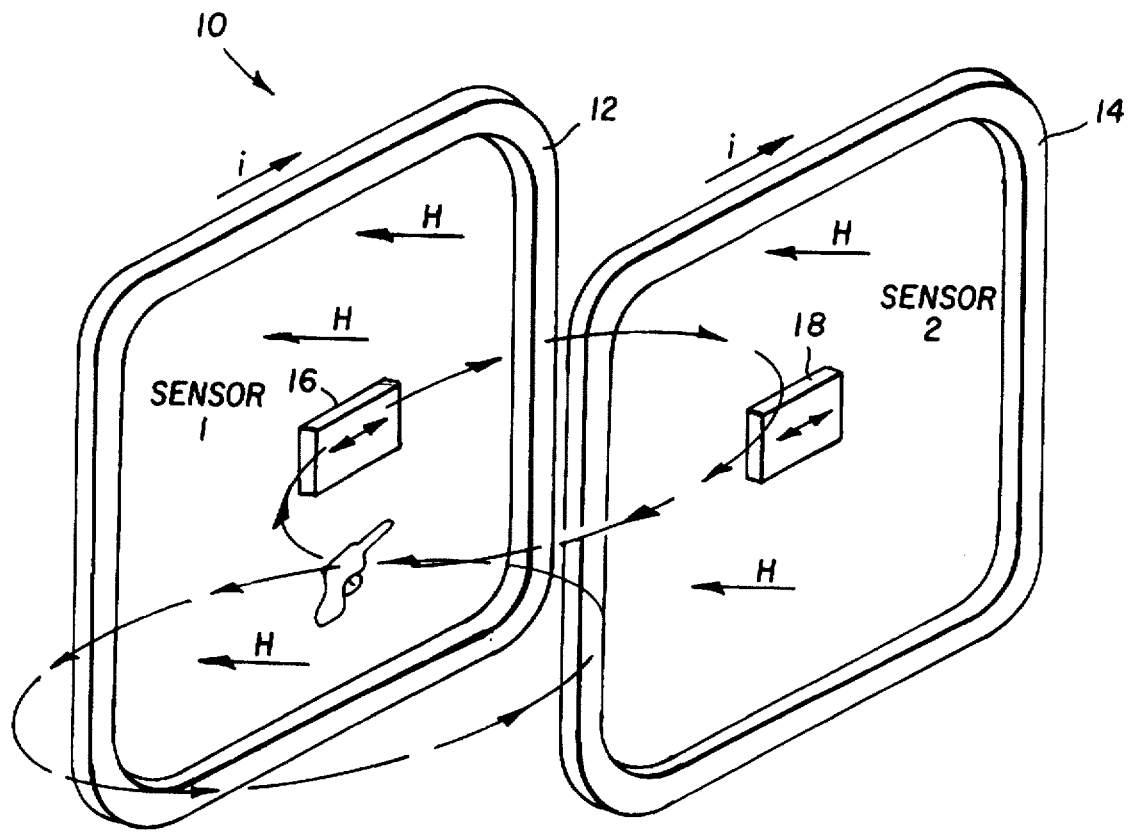
FIG. 1 is a diagrammatic perspective view of an embodiment of the present invention.
Figure 2:
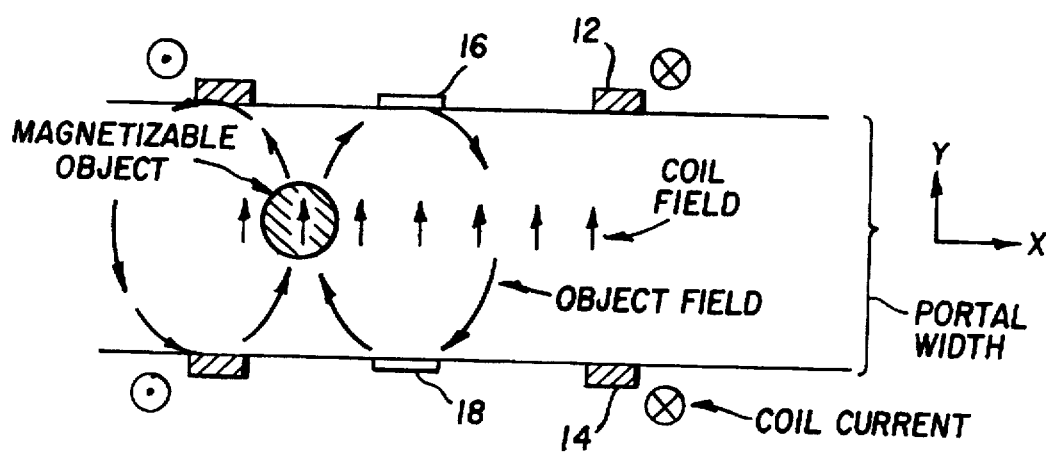
FIG. 2 is a diagrammatic plan view of the embodiment of FIG. 1.

Referring now to FIGS. 1 and 2 there is shown an embodiment of the present invention. As shown, apparatus 10 for detecting magnetizable objects includes magnetic coils 12 and 14 spaced from one another by a distance sufficient to allow the passage of a person or object to be monitored. For example, a security gate at an airport for monitoring persons can have a spacing of four feet to allow the passage of a person through the magnetic field between coils 12 and 14. Magnetic field detectors 16 and 18, such as magnetoresistive sensors, are located within coils 12 and 14 respectively. Coils 12,14 produce a magnetic field H which is generally perpendicular to the planes of coils 12,14 and to the direction of passage of a person (and of a metallic object carried by the person) between coils 12,14. Detectors 16,18 have their sensitive axes perpendicular to the coil detecting field and parallel to the direction of person/object passage (i.e., X direction). Hence, a high gain can be used because signals from the coils 12,14 are rejected. The net signal is then also less dependent on the Y position of the object being detected.

Figure 3:
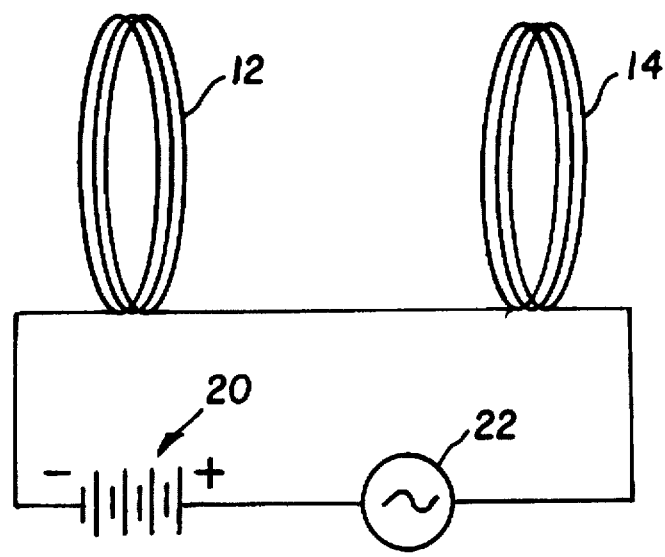
FIG. 3 is a schematic view of a power supply for the coils of the embodiment of FIG. 1.
Figure 4:
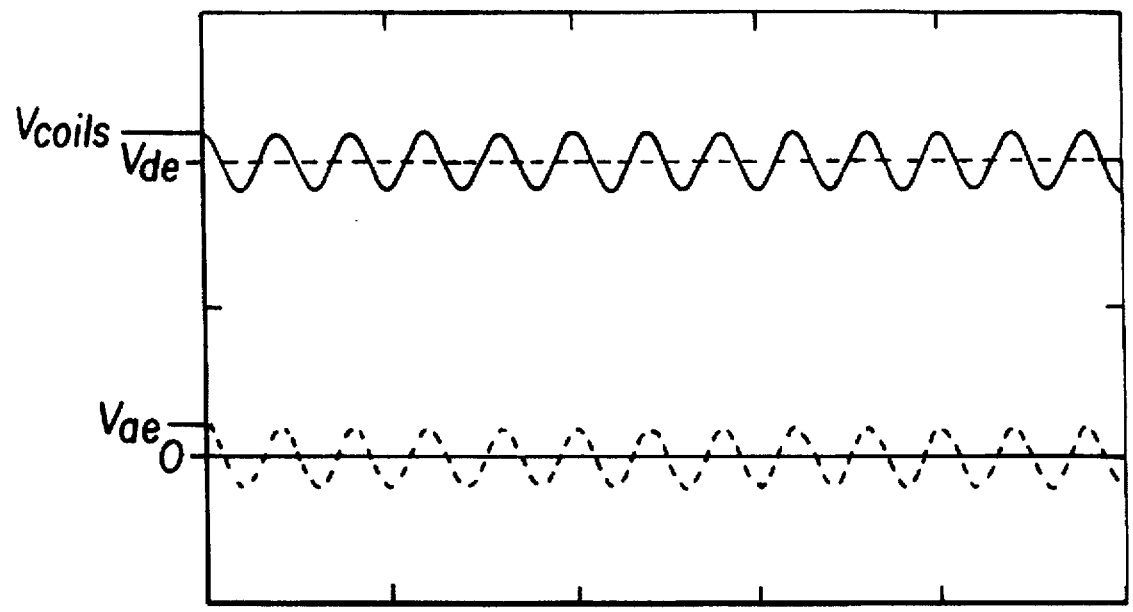
FIG. 4 is a graphical view of the power voltage supplied by the power supply of FIG. 3.

FIG. 3 is a schematic diagram of a power source for coils 12,14. As shown, coils 12, 14 are connected in series with a DC voltage source 20 and an AC voltage source 22. The voltage applied to coils 12,14 is the sum of the DC and AC voltages. The DC voltage is set to give a steady magnetic field of about 2 Oersteds, well below a magnetic field that can disturb pacemaker devices. The supply voltages of FIG. 3 are graphically illustrated in FIG. 4. The DC field induced signal would be a measure of the magnetic moment of a detected magnetizable object, while the AC field induced signal would be a measure of its electrical conductivity because of the induced eddy current fields.

Figure 5:
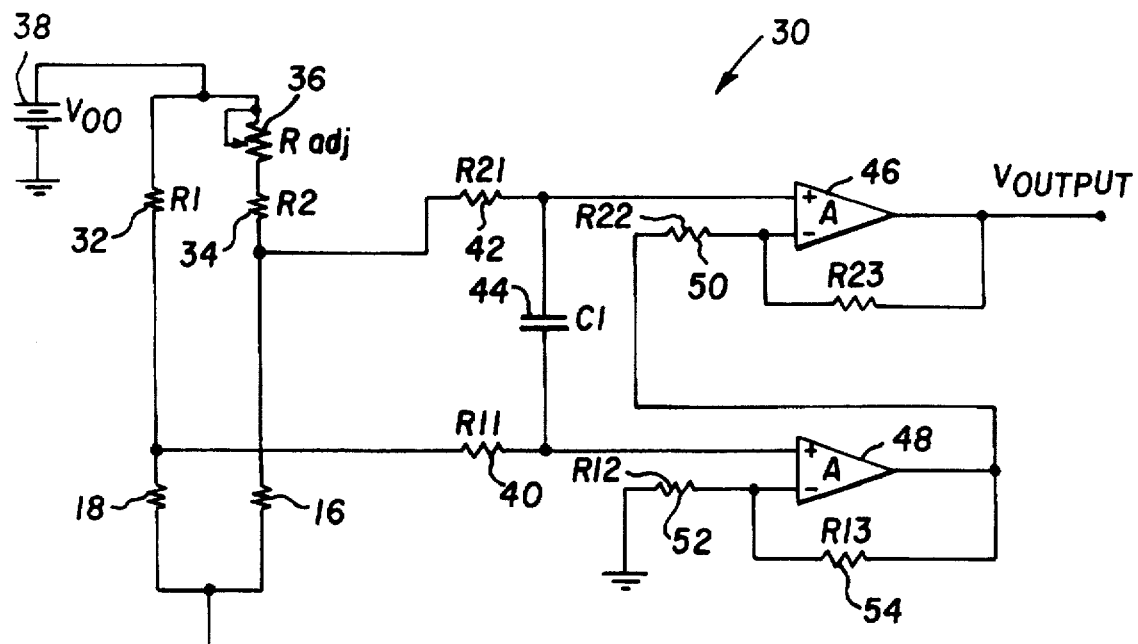
FIG. 5 is a schematic view of a detection circuit including the detectors of the embodiment of FIG. 1.

As shown in FIG. 5, detectors 16 and 18 are connected in a bridge detecting circuit 30 including balance resistors 32 and 34 and adjustable resistor 36. Circuit 30 also includes DC voltage source 38, differential amplifier 46, amplifier 48, resistors 40, 42, 50, 52, 54, and capacitor 44. The resistance of adjustable resistor 36 is set so that the output voltage $V_{out}$ is zero with no magnetizable object between coils 12,14.

When the field at detectors 16,18 changes due to an object passing between coils 12,14, the resistances of detectors 16,18 change and an output voltage signal is generated by the differential amplifier circuit. The signals from sensors 16,18 are subtracted so that this output signal is free from common mode field noise and thermally generated noise.

Figure 7:
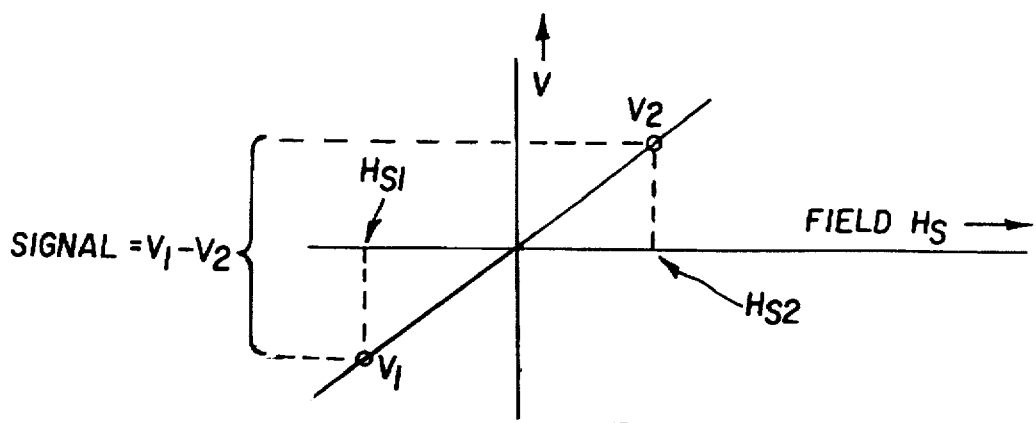
FIG. 7 is a graphical view of detection signal voltage versus magnetic field for the embodiment of the invention of FIG. 1.

FIG. 7 is a graphical view depicting signal voltage versus field for the detecting circuit of FIG. 5. As shown, the signal vs. field curves for detectors 16 and 18 are identical and have the same slope. Thus, common mode field noise as well as thermally induced noise is eliminated. This is in contrast to the Votruba Hall effect sensor configuration in which the voltage vs. field curves have opposite slopes and common mode field noise cannot be eliminated in the detection signal.

Figure 6:
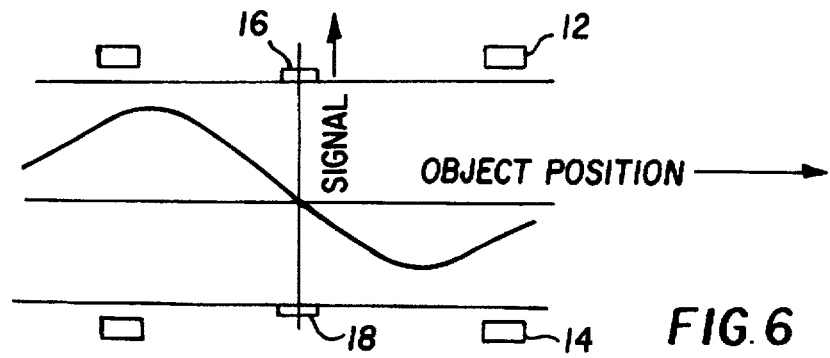
FIG. 6 is a diagrammatic, graphical view illustrating detection signal output versus object position for the embodiment of FIG. 1.

When a magnetizable object enters the portal between coils 12,14 (FIG. 2) from the left, the signal field seen at sensor 18 is in the —X direction and that at sensor 16 is in the +X direction, as shown. At the center of coils 12,14 the object field is in the Y direction and so the net signal is zero. When the object passes out of the coil region, the signal fields change direction and the net signal changes polarity as illustrated in FIG. 6.

The dimensions and spacing between coils 12,14 could be in a Helmholtz configuration where the coil separation is equal to the coil radius. This configuration would give a very uniform field in the portal between coils 12,14 so that the signal would be less dependent on the Y position of the magnetizable object.

Although the invention has been described with reference to preferred embodiments thereof, it will be understood that variations and modifications can be effected within the spirit and scope of the invention.

What is claimed is:

1. Apparatus for detecting a magnetizable object comprising:

first and second spaced coils for producing a magnetic field between said spaced coils;

first and second magnetic field detectors respectively located within said coils with their sensitive axes parallel to the direction of passage of a magnetizable object between said spaced coils and perpendicular to the field of said coils; and electrical circuitry coupled to said first and second magnetic field detectors for producing a detection signal in which common mode field noise and thermally induced noise is substantially eliminated.

2. The apparatus of claim 1 wherein said magnetic field detectors are magnetoresistive sensors.

3. The apparatus of claim 1 including a voltage source for supplying to said coils a DC voltage and an AC voltage to produce a DC induced field which produces a signal in said detectors which is a function of the magnetic moment of a detected object and an AC induced field which produces a signal in said detectors which is a function of induced eddy current fields of said detected object.

4. The apparatus of claim 1 wherein the dimensions of said first and second coils and said spacing between said coils are equal so as to form a Helmholtz coil pair so that the signal produced by said detectors is less dependent on the relative spacing of said object with respect to said coils.

5. The apparatus of claim 1 wherein said detectors are connected in said detection circuitry so as to give a difference signal.

* * * * *